United States Patent
Chai et al.

(10) Patent No.: US 9,471,584 B2
(45) Date of Patent: Oct. 18, 2016

(54) DEMAND PAGING METHOD FOR MOBILE TERMINAL, CONTROLLER AND MOBILE TERMINAL

(75) Inventors: Yipeng Chai, Shanghai (CN); Mingjun Jia, Shanghai (CN); Yanshan Shi, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 9 days.

(21) Appl. No.: 13/698,337

(22) PCT Filed: Aug. 15, 2011

(86) PCT No.: PCT/CN2011/078422
§ 371 (c)(1),
(2), (4) Date: Dec. 26, 2012

(87) PCT Pub. No.: WO2012/113206
PCT Pub. Date: Aug. 30, 2012

(65) Prior Publication Data
US 2013/0212077 A1  Aug. 15, 2013

(51) Int. Cl.
*G06F 7/00* (2006.01)
*G06F 17/30* (2006.01)
(Continued)

(52) U.S. Cl.
CPC ......... *G06F 17/30153* (2013.01); *G06F 12/08* (2013.01); *G06F 17/3007* (2013.01); *G06F 17/30129* (2013.01); *H04L 67/06* (2013.01); *H04L 69/04* (2013.01);
(Continued)

(58) Field of Classification Search
None
See application file for complete search history.

(56) References Cited

U.S. PATENT DOCUMENTS 6,195,107 B1  2/2001  Iverson
6,349,375 B1  2/2002  Faulkner et al.
(Continued)

FOREIGN PATENT DOCUMENTS

CN  1902603 A  1/2007
CN  101146191 A  3/2008
(Continued)

OTHER PUBLICATIONS

Wynn et al., "The effect of compression on performance in a demand paging operating system", The Journal of Systems and Software 50, pp. 151-170, 2000, Elsevier Science Inc.*
(Continued)

*Primary Examiner* — Michael Hicks
(74) *Attorney, Agent, or Firm* — Kilpatrick Townsend & Stockton LLP

(57) ABSTRACT

A demand paging method for a mobile terminal, a controller and a mobile terminal, wherein the demand paging method determines, when a mobile terminal needs to operate a compressed file, a storage location of the compressed file in an external part of the controller of the mobile terminal; a decoding unit of the internal part of the controller of the mobile terminal decompresses the compressed file in the storage location; the mobile terminal saves the decompressed file to a designated part of the memory, wherein the designated part of the memory comprises the memory in the internal part of the controller of the mobile terminal and/or the memory in the external part of the controller of the mobile terminal; the mobile terminal continues to operate on the basis of the decompressed file. The technical solution increases the processing efficiency of demand paging of the mobile terminal.

21 Claims, 3 Drawing Sheets

(51) Int. Cl.
    *G06F 12/08*      (2016.01)
    *H04L 29/08*      (2006.01)
    *H04L 29/06*      (2006.01)

(52) U.S. Cl.
    CPC .. *G06F 2212/251* (2013.01); *G06F 2212/253* (2013.01); *G06F 2212/401* (2013.01)

(56) References Cited

U.S. PATENT DOCUMENTS

| | | | |
|---|---|---|---|
| 7,512,767 B2 * | 3/2009 | Ritzau | 711/170 |
| 7,617,381 B2 * | 11/2009 | Kim et al. | 711/209 |
| 2002/0118307 A1 | 8/2002 | Lee | |
| 2004/0250009 A1 | 12/2004 | Chen et al. | |
| 2005/0132161 A1 * | 6/2005 | Makela et al. | 711/170 |
| 2008/0291496 A1 | 11/2008 | Hara | |

FOREIGN PATENT DOCUMENTS

| | | |
|---|---|---|
| EP | 1926022 A2 | 5/2008 |
| GB | 2319865 A | 3/1998 |
| WO | 2012/113206 A1 | 8/2012 |

OTHER PUBLICATIONS

Park et al., "A low-cost memory architecture with NAND XIP for mobile embedded systems", Proceedings of the 1st IEEE/ACM/IFIP international conference on Hardware/software codesign and system synthesis, pp. 138-143, 2003, ACM.*

International Search Report of the corresponding PCT Application No. PCT/CN2011/078422, mailed May 24, 2012, 3 pages.

European Search Report for European counterpart application 11859503.2.

\* cited by examiner

DEMAND PAGING METHOD FOR MOBILE
TERMINAL, CONTROLLER AND MOBILE
TERMINAL

FIELD OF THE DISCLOSURE

The present disclosure generally relates to communication technology, and more particularly, to a method for demand paging, a controller and a mobile terminal including the same.

CROSS REFERENCE TO RELATED
APPLICATIONS

This application is a Section 371 National Stage Application of International Application No. PCT/CN2011/078422, filed on Aug. 15, 2011, the entire contents of which are incorporated herein by reference in their entirety.

BACKGROUND

With the popularity of mobile terminals, there is an ever increasing number of application programs operated in mobile terminals in order to provide more services to users. Generally, a user may run multiple application programs at the same time while using a mobile terminal, which increases the burden of a memory of the mobile terminal to access instructions and data.

Currently, a virtual memory mechanism is applied to the mobile terminal, so as to increase a visible size of a main memory or a Random Access Memory (RAM) of the main memory. That is, a storage area, known as an auxiliary memory or a secondary memory, in a non-volatile memory including a hard disk, a USB or Flash memory, is employed to backup the RAM. In this way, virtual address spaces are added to the physical RAM. The virtual address space is generally divided into plurality of page frames which are accessible by a processor. A Memory Management Unit (MMU) provides a mechanism to convert a virtual address from processes running in a processor into a physical page of instructions or data required by the processes. If there is a lack of a physical page, instructions or data required by the system are invoked from an external memory to a physical page in a main memory, and the physical page is mapped to the virtual address. If the replaced physical page is modified, the physical page can be stored. Such a technology is called Demand Paging, which is originally applied in a UNIX system.

FIG. 1 is a schematic structural diagram of a common type of mobile terminal. Referring to FIG. 1, the mobile terminal 1 includes a controller 10, an external auxiliary memory 11 and an external memory 12 configured outside the controller 10 of the mobile terminal 1, all of which are coupled together via a bus 13. The controller 10 further includes a central processing unit (CPU) 101, a direct access memory controller (DAMC) 102, a memory management unit (MMU) 103 and an internal memory 104, all of which are also coupled together via the bus 13.

Specifically, when the CPU executes a program which normally includes a plurality of processes, through the DMAC 102, the CPU can access physical pages of the instructions or data required by the processes which are stored in the internal memory 104. If the internal memory 104 is lack of physical pages to run programs, the CPU can invoke the instructions or data required by the processes from the external auxiliary memory 11 to a physical page in the internal memory 104, and the physical page is mapped to the virtual address. Specifically, the MMU 103 provides mechanism of converting a virtual address from processes running in the CPU 101 into a physical page of the instructions or data required by the processes.

Further, in order to save storage spaces in the external auxiliary memory 11, a part of instructions or data of programs are stored in a compressed format. When the CPU 101 needs to read a compressed file, firstly, it is needed to decompress the compressed file using a decoding program (not shown) configured outside the controller 10. Typically, the decompressed file is stored in the external memory 12. Then, instructions or data in the decompressed file are acquired according to mapping and conversion between the virtual address provided by the MMU 103 and the physical address of the external memory 12, and programs are operated based on the decompressed file.

However, in operating a program in a mobile terminal described above, the decoding program configured outside the controller 10 has a slow decompressing speed, and the decompressed file is not stored in an internal memory inside the controller, which thereby lead to a resource waste of the internal memory, and a low speed of the CPU to operate the decompressed file.

More information relating to demand paging may refer to U.S. Pat. No. 7,617,381B2 which discloses a demand paging apparatus and method for embedded system. However, the disclosure does not solve the above problems.

SUMMARY

The present disclosure provides a method for increasing the speed of decoding compressed files in the mobile terminal and improving the efficiency of demand paging in the mobile terminal.

Embodiments of the present disclosure provide a method for demand paging in a mobile terminal. The method includes: determining a storage location of a compressed file configured outside a controller of the mobile terminal when the mobile terminal needs to operate the compressed file; decompressing the compressed file by a decoding unit inside the controller, and storing the decompressed file in a designated memory, where the designated memory comprises an external memory outside the controller and/or internal memory inside the controller; and operating based on the decompressed file.

Optionally, the storage location of the compressed file outside a controller of the mobile terminal includes: a storage location in an external auxiliary memory where the compressed file is stored, or a storage location in an external memory to which the compressed file is moved from an external auxiliary memory.

Optionally, when a prefetch fault or a data abort occurs in the operation of the controller of the mobile terminal, the mobile terminal needs to operate the compressed file.

Optionally, determining a storage location of the compressed file outside a controller of the mobile terminal includes: determining an instruction address which causes the prefetch fault or determining a data address which causes the data abort; and determining a storage address in the external auxiliary memory and a storage length of the compressed file corresponding to the instruction address or data address based on an index table of the compressed file.

Optionally, the method further includes: moving the compressed file from the external auxiliary memory to the external memory outside the controller of the mobile terminal; and determining a storage location of the compressed file based on the length of the compressed file and the address where the compressed file locates in the memory outside the controller of the mobile terminal.

Optionally, before operating based on the decompressed file, the method further includes: mapping an instruction address which causes the prefetch fault or a data address which causes the data abort to the location which the decompressed file are stored in.

Optionally, the designated memory is determined by page frame alignment.

Optionally, when the mobile terminal needs to operate the compressed file, the mobile terminal enters an abnormal mode; and when operating based on the decompressed file, the mobile terminal restores to a working mode and state before the abnormal mode.

Optionally, the compressed file is contained in image files stored in an external auxiliary memory, and the image files further contain uncompressed files.

Optionally, when an uncompressed file which is not stored inside the controller of the mobile terminal is needed to be operated, the controller of the mobile terminal operates based on the uncompressed file stored in the external auxiliary memory; or the controller of the mobile terminal moves the uncompressed file from the external auxiliary memory to an external memory outside the controller of the mobile terminal, and then the controller of the mobile terminal operates based on the uncompressed file stored in the external memory outside the controller of the mobile terminal.

Optionally, the image files include instruction and constants of a program and initialized variables of a program.

Optionally, the method further includes operating an uncompressed file to initialize the operating environment.

Optionally, if the uncompressed file is stored in a NAND flash, operating an uncompressed file includes: copying the uncompressed file stored in the NAND flash to an external memory outside the controller of the mobile terminal, and operating the uncompressed file stored in the external memory outside the controller of the mobile terminal.

Optionally, if the uncompressed file is stored in a NOR flash, operating an uncompressed file includes: operating the uncompressed file stored in the NOR flash.

Embodiments of the present disclosure provide a controller, which includes: a central processing unit, a direct access memory controller, a memory management unit, an internal memory and a decoding unit, all of which are coupled together via a bus, where the decoding unit serves to decompress a compressed file stored in an external auxiliary memory, and to store a decompressed file into a designated memory which comprises an external memory configured outside the controller and/or the internal memory configured inside the controller.

Embodiments of the present disclosure provide a mobile terminal, which includes: a controller, an external auxiliary memory and an external memory configured outside the controller of the mobile terminal, all of which are coupled together via a bus, where the controller comprises a central processing unit, a direct access memory controller, a memory management unit, an internal memory and a decoding unit, all of which are coupled together via the bus, where the decoding unit serves to decompress a compressed file stored in the external auxiliary memory, and to store a decompressed file into a designated memory which comprises the external memory configured outside the controller and/or the internal memory configured inside the controller.

Optionally, there are compressed files and uncompressed files stored in the external auxiliary memory, and the compressed files and the uncompressed files may include instructions and constants, initialized variables and un-initialized variables.

Optionally, there are compressed files and uncompressed files stored in the external auxiliary memory, the uncompressed files may include instructions and constants, initialized variables and un-initialized variables, and the compressed files comprise instructions and constants.

Optionally, the external auxiliary memory may include one of a flash memory a hard disk, an optical disk and a USB flash.

Optionally, the central processing unit is adapted for operating an uncompressed file stored in the external auxiliary memory, or for operating an uncompressed file which are moved from the external auxiliary memory to the external memory configured outside the controller of the mobile terminal.

Compared with the existing technique, embodiments of this disclosure have the following advantages:

In a mobile terminal, a decoding unit is configured inside a controller to decompress compressed files stored outside the controller of the mobile terminal and the mobile terminal operates based on the decompressed files. In this way, the speed of decoding compressed files in the mobile terminal is increased, thus improving the efficiency of demand paging in the mobile terminal.

In addition, the decompressed files are stored in a designated memory. The designated memory includes an external memory configured outside the controller and/or an internal memory configured inside the controller. By storing a part of the decompressed files in the internal memory, the storage resource of the internal memory inside the controller of the mobile terminal is utilized effectively, thereby improving the efficiency of demand paging in the mobile terminal.

DETAILED DESCRIPTION OF THE DISCLOSURE

In existing mobile terminals, during operating a program, a decoding program configured outside a controller of a mobile terminal generally has a slow decompressing speed, and decompressed files are not saved in an internal memory of the controller, which thereby lead to a resource waste of the internal memory, and a reduction of speed of running the decompressed files by a CPU.

To solve the above problems, the present disclosure provides a method for demand paging, a controller and a mobile terminal including the same. According to embodiments of the present disclosure, the speed of decoding a compressed file is increased greatly, and the storage resource of the internal memory in the controller is utilized effectively by saving a part of the decompressed file in the internal memory, which thereby improves processing efficiency of demand paging in the mobile terminal.

In order to clarify the objects, characteristics and advantages of disclosure, the embodiments of the present disclosure will be described in detail in conjunction with the accompanying drawings.

Figure 3:
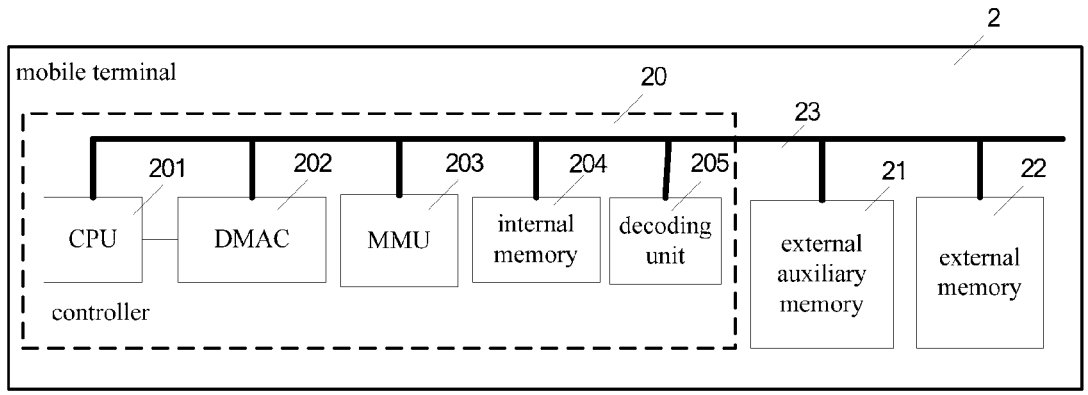
FIG. 3 illustrates a schematic structural diagram of a mobile terminal according to one embodiment of the present disclosure.

FIG. 3 illustrates a schematic structural diagram of a mobile terminal according to one embodiment of the present disclosure. Referring to FIG. 3, a mobile terminal 2 includes a controller 20, an external auxiliary memory 21 and an external memory 22 configured outside the controller 20, all of which are coupled together a bus 23. The controller 20 includes a central processing unit (CPU) 201, a direct access memory controller (DAMC) 202, a memory management unit (MMU) 203, an internal memory 204 and a decoding unit 205, all of which are coupled together via the bus 23.

If instructions or data required by the operation of the CPU 201 are not stored in the internal memory 204 of the controller 20, the CPU 201 can operate uncompressed files stored in the external auxiliary memory 21 or uncompressed files which are moved from the external auxiliary memory 21 to the external memory 22. Specifically, the CPU 201 may acquire uncompressed files according to mapping and conversion between the virtual address provided by the MMU 203 and the physical address of the external auxiliary memory 21 or of the external memory 22.

Files in the external auxiliary memory 21 are stored in image file format. The image files are binary and include uncompressed files and compressed files, where both compressed files and uncompressed files include RO for programs' instructions and constants, RW for programs' initialized variables, and ZI for programs' un-initialized variables. In other embodiments, the uncompressed files may include RO for programs' instructions and constants, RW for programs' initialized variables, and a ZI for programs' un-initialized variables, and the compressed files may include RO for programs' instructions and constants. The programs' instructions and constants may include resource data required by software interface display, like images, menus and texts, and other instructions which can be compressed.

During the execution of a program, the RO in the program may serve to process at least following two events: moving the RW from the external auxiliary memory 21 to the internal memory 204, and resetting a part of the internal memory 204 where the ZI locates. The ZI is not in the image file, so the program needs to reset the internal memory 204 where corresponds to address and size of the ZI according to a compiler (not shown in FIG. 3).

The uncompressed files in the external auxiliary memory 21 have the following functions: 1) initializing the basic environment required for system operation; 2) suspending instructions and data which can not be operated by using the Demand Paging technology; and 3) operating instructions and data required by the Demand Paging technology.

In some embodiments, the external auxiliary memory 21 may include one of a flash memory, a hard disk, an optical disk and a USB flash memory. In some embodiments, the external auxiliary memory 21 may include other non-volatile memory, which is not described in detail herein.

In some embodiments, the external auxiliary memory 21 is flash memory, as an example. Generally, there are two types of flash memories: NAND flash memory and NOR flash memory. It is known in the art that there is a distinct difference in addressing mode between a NAND flash memory and a NOR flash memory. For an NAND flash memory, block address, page address and column address are assigned for reading data, where the column address is a start address of a page to be read. When data is to be read from a NAND flash memory, the data is firstly read in a page buffer. Then addressing is performed in the buffer according to input address in an input/output line, which is achieved according to the start address assigned by the column address.

Further, the NAND flash memory is operated in pages. Writing-in data is also buffered in the page buffer. Specifically, data and instructions are written in the page buffer and they are written in a page together. Therefore, for a NAND flash memory, if a byte needs to be re-written, a whole page needs to be re-written accordingly. Further, the whole page should be erased completely, or it can not be programmed, that is, a page must be empty before writing-in. Therefore, for an NAND flash memory, a buffer is needed to ensure reading/writing operation in pages. However, for an NOR flash memory, it is operated in bytes, where reading and writing can be conducted to a particular byte, and erasing is conducted in sections, unlike reading and writing.

It should be noted, the controller 20 and the external memory 22 may be integrated in a same chip, or alternatively, the controller 20 may be a single chip and the external memory 22 is configured outside it. Whatever packaging manners, there should be certain logic relations among the controller 20, the internal memory 204 and the external memory 22.

Figure 4:
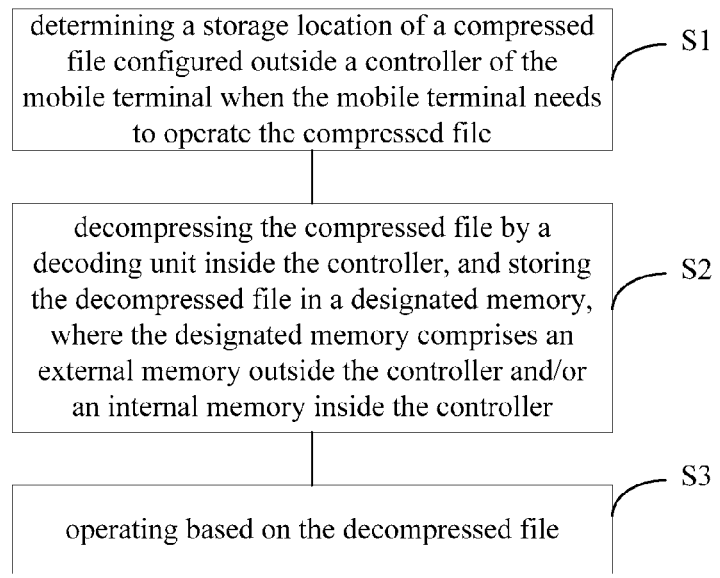
FIG. 4 illustrates a schematic flow chart of a method for demand paging according to one embodiment of the present disclosure.

Compared with the conventional technique, the decoding unit 205 is configured inside the controller 20 in a hardware form. Specifically, in demand paging, the decoding unit 205 serves to decompress a compressed file stored in the external auxiliary memory 21, and to store a decompressed file into a designated memory. The designated memory includes the external memory 22 outside the controller 20 and/or the internal memory 204 inside the controller 20. The method for demand paging according to one embodiment of the present disclosure is illustrated in FIG. 4.

In some embodiments, the external memory 22 configured outside the controller 20 may be a Random Access Memory (RAM). In operating a program, the uncompressed file generally includes sections of RW and ZI, there are two different cases for different types of external auxiliary memory 21. For an NOR flash memory used as the external auxiliary memory 21, RO in the uncompressed file may also be stored in the RAM, and for a NAND flash memory used as the external auxiliary memory 21, RO in the uncompressed files and instructions and data in compressed files required for operating programs must be stored in the RAM.

Figure 1:
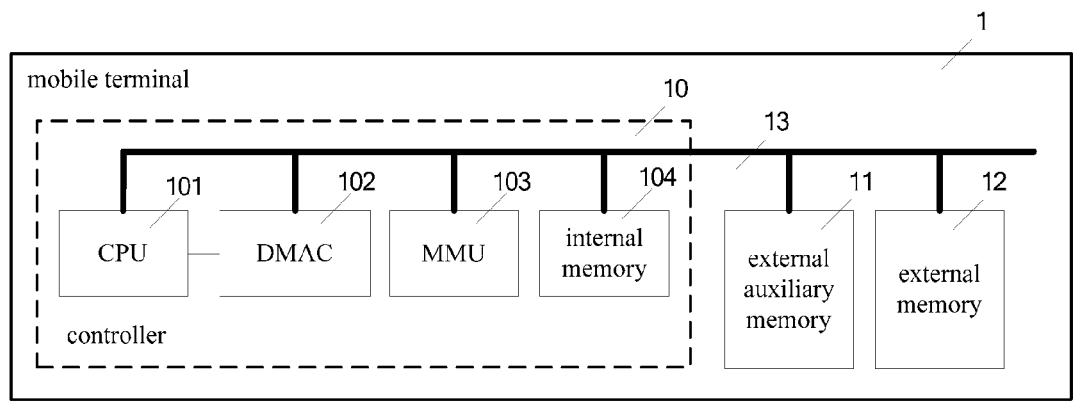
FIG. 1 illustrates a schematic structural diagram of an existing type of mobile terminal.
Figure 2:
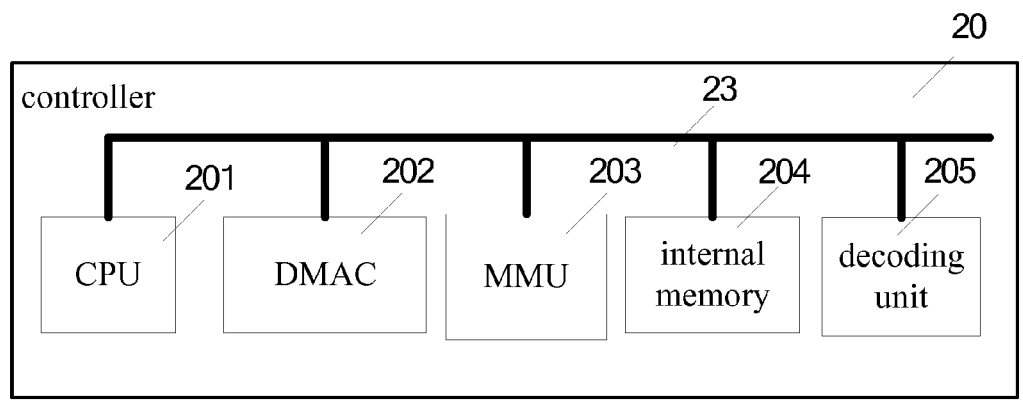
FIG. 2 illustrates a schematic structural diagram of a controller according to one embodiment of the present disclosure.

According to one embodiment of a controller shown in FIG. 2, the controller includes: a central processing unit (CPU) 201, a direct access memory controller (DAMC) 202, a memory management unit (MMU) 203, an internal memory 204 and a decoding unit 205, all of which are coupled together via a bus 23. The decoding unit 205 serves to decompress a compressed file stored in the external auxiliary memory (not shown in FIG. 2), and to store a decompressed file into a designated memory. The designated memory may include an external memory 22 (not shown) configured outside the controller and/or the internal memory 204 configured inside the controller 20.

It should be noted that, in practice, the controller may be a single chip, which may be connected to the external auxiliary memory 21 and the external memory 22 via the bus 23.

FIG. 4 is a schematic flow chart of a method for demand paging in a mobile terminal according to one embodiment of the present disclosure. Referring to FIG. 4, the method includes steps of S1, S2 and S3.

S1: determining a storage location of a compressed file configured outside a controller of a mobile terminal when the mobile terminal needs to operate the compressed file.

The storage location of the compressed file outside the controller of the mobile terminal may be a storage location in an external auxiliary memory where the compressed file is stored, or a storage location in an external memory to which the compressed file is moved from an external auxiliary memory.

In some embodiments, the external auxiliary memory is a flash memory. For example, the storage location of the compressed file outside a controller of the mobile terminal may be a storage location in a NOR flash memory, or a storage location in an external memory to which the compressed file is moved from a NAND flash memory.

In some embodiments, the compressed file is contained in image files stored in the external auxiliary memory. The image files further include uncompressed files. The image files include instructions and constants of a program and initialized variables of a program.

In some embodiments, the compressed file is needed to be operated when a prefetch fault or a data abort occurs in a controller operating. The prefetch fault occurs when a MMU fails to map an access address to a physical address in a physical memory when a CPU tries to read instructions with the access address. Data abort occurs when a MMU fails to map the access address to a physical address in a physical memory when a CPU tries to read data with the access address.

A method for determining a storage location of the compressed file outside a controller of the mobile terminal varies with types of the external auxiliary memory. Similar, take a flash memory as example. If a NOR flash memory as the external auxiliary memory, the determining method includes:

1) Determining an instruction address which causes the prefetch fault or determining a data address which causes the data abort. In some embodiments, if a mobile terminal needs to operate a compressed file, the mobile terminal enters an abnormal mode. In the abnormal mode, instructions and data generated in the abnormal mode may be automatically stored into a register by the CPU, which can be accessed in the abnormal mode. The instructions and data generated in the abnormal mode include the instruction address corresponding to which the prefetch fault occurs or the data address corresponding to which the data abort occurs.

2) Based on an index table of the compressed file, determining a storage address of the compressed file and a storage length of the compressed file corresponding to the instruction address or data address.

Figure 5:
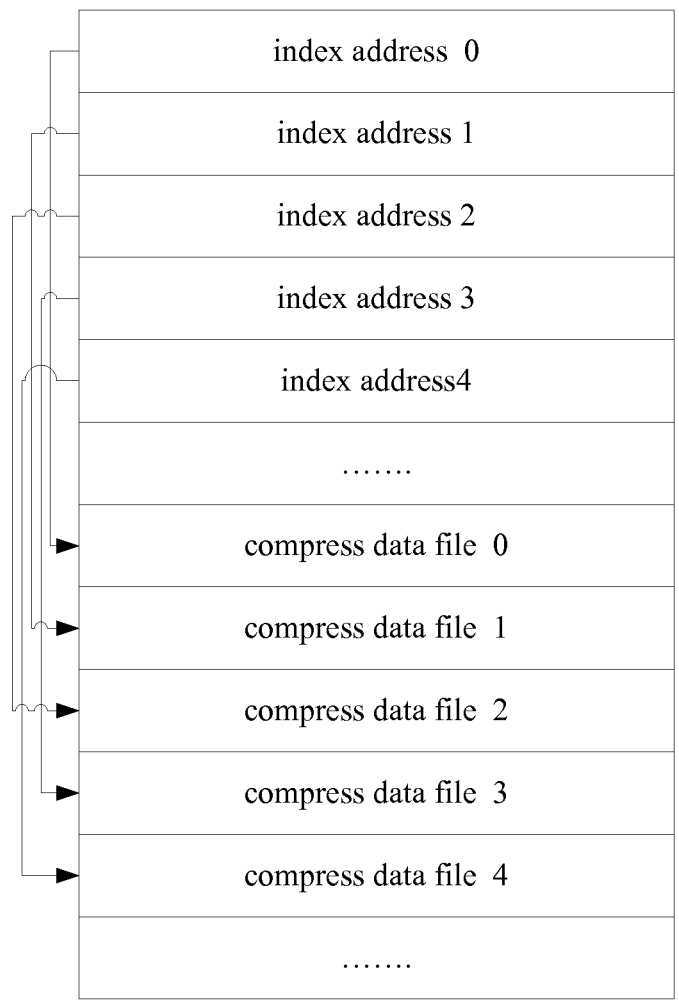
FIG. 5 illustrates a schematic structural diagram of a compressed file package according to one embodiment of the present disclosure.

Specifically, the index table of the compressed file may refer to the schematic structural diagram of a compressed file package according to one embodiment of the present disclosure shown in FIG. 5. Referring to FIG. 5, an index list of compressed files is in the head of a compressed file package. Each index address in the index list directs to a corresponding compress data file. The index address illustrates an absolute location of the compress data file, which includes an instruction address or data address. For example, index address 0 directs to compress data file 0, index address 1 directs to compress data file 1, index address 2 directs to compress data file 2, index address 3 directs to compress data file 3, index address 4 directs to compress data file 4, and so on. Assuming that the length of each compress data file has a length of 4 k bytes, which may vary after compressed. For example, to find a third compress data file (the compress data file 2 in the index table), an address of the compress data file 2 to which the index address 2 directs needs to be found in the index list firstly, then the content from the starting of the address of the compress data file 2 till the index address 3 (just before the index address 3) is read, as such, the content corresponding to the third compress data file can be obtained.

It should be noted that the index table of compressed files above is provided for illustration, which tends not to limit the scope of the disclosure. In some embodiments, the index list may include a plurality of index units. Each index unit identifies not only the absolute location of the corresponding compress data file, but also corresponding compress data file's length. In some embodiments, each index unit only identifies the length of the corresponding compress data file. In some embodiments, each index unit is not located in the head of the compressed file package, but in the head of its each compress data file.

If a NAND flash memory is used as the external auxiliary memory, whose access speed is slower than that of the NOR flash, the compressed file needs to be moved into the memory outside the controller. Accordingly, the method further includes: moving the compressed file to a memory outside the controller of the mobile terminal, and determining a storage location of the compressed file based on the length of the compressed file and the address where the compressed file locates in the memory outside the controller of the mobile terminal.

It should be noted that if a NOR flash is used as the external auxiliary memory, the above steps may also be used, similarly to the NAND flash. That is, the compressed file stored in the NOR flash memory is moved to an external memory outside a controller of the mobile terminal, and then a storage location of the compressed files outside a controller of the mobile terminal is determined based on the length of the compressed file and the address where the compressed file locates in the memory outside the controller of the mobile terminal.

S2: decompressing the compressed file by a decoding unit in the controller, and storing the decompressed file in a designated memory which includes an external memory outside the controller and/an internal memory inside the controller.

In some embodiments, the designated memory may be determined by page frame alignment As described above in S1, if a NOR flash memory is used as the external auxiliary memory, the storage location is in the NOR flash memory; if a NAND flash memory, the storage location is in the external memory outside the controller of the mobile terminal. The storage address and storage length of the compress data file, together with the storage address and length of the decompressed data in a memory which is determined by using page frame alignment are transmitted to the decoding unit by CPU. Then the CPU starts the decoding unit inside the controller of the mobile terminal, the decoding unit decompresses the corresponding stored compressed file and automatically stores the decompressed file into a designated memory. The designated memory may include the external memory outside the controller of the mobile terminal and/or the internal memory inside the controller of the mobile terminal.

The buffer storage of the page frame for demand paging is related to an access speed of the flash memory and a decoding speed of the decoding unit. In compressed files, instructions and data are compressed in blocks, therefore, a full block needs to be decompressed even if a piece of instruction in the block is to be operated. Further, the size of each program instruction and data to be compressed is at least the size of a page frame for demand paging. Accordingly, considering a compression ratio of instructions and data, a decoding speed and a size of a page frame for demand paging, the block for compression generally selected to be 4 KB (kilobyte) or 1 KB. That is, operating an instruction needs to decode 4 KB data or 1 KB data. In other words, if there is no buffer to store the decompressed files, programs will be operated every time through decompressing files, which causes a large amount of computation waste due to frequent decompressing.

Therefore, if an internal storage space (buffer) in the mobile terminal is used for storing decompressed files (e.g., instructions and data), the number of times to decompress files can be reduced in operating programs. The larger the size of the internal storage, the lower the number of times to decompress files, accordingly, the lower the requirements for the access speed of the flash memory (a NAND flash memory or a NOR flash memory) and the decompressing speed of the decoding unit inside the controller, and vice versa. In practice, providing a buffer having a capacity of 64 decompressed data frames, if it takes 40 microseconds at most to decompress a frame of data, the performance of the mobile terminal degrades only by 10% to 20% compared with a mobile terminal without demand paging. Therefore, In a mobile terminal with a flash memory (such as a NOR flash memory) having a higher access speed and a decoding unit having a higher decompressing speed, an internal memory inside a controller of the mobile terminal may be used as a buffer to store the decompressed data frame; and in a mobile terminal with a flash memory (such as a NAND flash memory) having a lower access speed and a decoding unit having a lower decompressing speed, an external memory outside a controller of the mobile terminal may be used as a buffer to store the decompressed data frame.

S3: the mobile terminal operates based on the decompressed file.

In some embodiments, when the mobile terminal operates based on the decompressed file, the mobile terminal switches to a working mode and state before the abnormal mode, i.e., the mobile terminal switches to operate programs from the state of prefetch fault or data abort. In some embodiments, before the mobile terminal operates based on the decompressed files, the method further includes: mapping the instruction address which causes prefetch fault or a data address which causes data abort to an address of the memory where the decompressed file locates.

In some embodiments, prior to the step S1, the method may further include: operating the uncompressed file to initialize the operating environment. Instructions and data in the uncompressed files are operated to establish a basic operating environment, including processes to ensure system to operate normally, all the modules in the mobile terminal configured appropriately to operate, and data capable of being read and displayed normally. The step may differ with the types of the flash memory.

In some embodiments, if the uncompressed file is stored in a NAND flash memory, the mobile terminal operating based on the uncompressed file may include: copying the uncompressed file stored in the NAND flash to an external memory outside the controller of the mobile terminal, and operating the uncompressed file stored in the external memory outside the controller of the mobile terminal. In some embodiments, if the uncompressed files are stored in a NOR flash memory, the mobile terminal operating based on the uncompressed file may include: directly operating the uncompressed file stored in the NOR flash memory.

Further, after the mobile terminal finishes the initialization and establishes the basic operating environment, the mobile terminal continues to operate programs. If the mobile terminal needs to operate an uncompressed file which is not stored inside the controller of the mobile terminal, the controller of the mobile terminal may operate based on the uncompressed file stored in the external auxiliary memory. Specifically, if the external auxiliary memory is a NOR flash memory, with a mechanism of mapping and conversion between a virtual address provided by a memory management unit (MMU) and a physical address of the external auxiliary memory, the CPU inside the controller of the mobile terminal may operate the uncompressed files stored in the external auxiliary memory.

In some embodiments, the controller of the mobile terminal may move the uncompressed file from the external auxiliary memory to an external memory outside the controller of the mobile terminal. And the controller of the mobile terminal operates based on the uncompressed file stored in the external memory outside the controller of the mobile terminal. For example, the external auxiliary memory is a NAND flash memory. Because the access speed of the NAND flash is slower than that of the NOR flash memory, there is a need to move the uncompressed file from the NAND flash memory to an external memory outside the controller of the mobile terminal. Then the CPU inside the controller of the mobile terminal may operate the uncompressed file stored in the external memory outside the controller of the mobile terminal.

In conclusion, embodiments of the disclosure increase the speed of decoding compressed file in the mobile terminal. In addition, the storage resource of the internal memory inside the controller of the mobile terminal can be utilized effectively by storing the decompressed file in the internal memory, which thereby improves the efficiency of demand paging in the mobile terminal.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for demand paging in a mobile terminal, wherein the mobile terminal comprises a controller, an external memory outside the controller and an internal memory inside the controller and wherein the method comprises:

determining a storage location of a compressed file configured outside a controller of the mobile terminal when the mobile terminal requests to operate the compressed file;

storing the compressed file in an external auxiliary memory based on an index list of the compressed file;

setting a designated memory for storing the decompressed file based on the determined storage location of the compressed file, wherein the designated memory is set by selecting the external memory outside the controller or internal memory inside the controller, and wherein setting the designated memory for storing the decompressed file based on the determined storage location of the compressed file comprises:

when the storage location of the compressed file is determined as being in a NOR flash memory, the designated memory is set to an external memory outside the controller, and when the storage location of the compressed file is determined as being in a NAND flash memory, the designated memory is set to an internal memory inside the controller;

decompressing the compressed file stored in the external auxiliary memory by a decoding unit inside the controller, wherein the decoding unit is in a hardware form;

storing the decompressed file in the designated memory;

operating the mobile terminal based on the decompressed file; wherein the index list comprises a plurality of index units to identify an absolute location of the compressed file;

each index unit of the plurality of index units comprises a plurality of index addresses to direct to the compressed file;

each index unit of the plurality of index units defines the length of the compressed file;

each index unit of the plurality of index units is stored in the head of the compressed file;

the absolute location comprises an instruction address generated in an abnormal mode and a data address; and the storage location is in at least one of a NOR flash memory, and an external memory to which the compressed file is moved from a NAND flash memory.

2. The method according to claim 1, where the storage location comprises a plurality of storage locations including a first storage location in the external auxiliary memory where the compressed file is stored, and a second storage location in the external memory to which the compressed file is moved from the external auxiliary memory.

3. The method according to claim 1, wherein determining the storage location is based at least in part on at least one of a prefetch fault or a data abort in the operation of the controller of the mobile terminal.

4. The method according to claim 3, wherein determining the storage location comprises:

determining the instruction address generated in the abnormal mode which causes the prefetch fault and determining a data address which causes the data abort; and determining a storage address in the external auxiliary memory and a storage length of the compressed file corresponding to the instruction address generated in the abnormal mode or data address based on the index list of the compressed file.

5. The method according to claim 4, further comprising:

moving the compressed file from the external auxiliary memory to the external memory outside the controller of the mobile terminal; and determining the storage location of the compressed file based on the length of the compressed file and the data address where the compressed file locates in the memory outside the controller of the mobile terminal.

6. The method according to claim 3, wherein determining the storage location of the compressed file outside a controller of the mobile terminal comprises mapping the instruction address generated in the abnormal mode which causes the prefetch fault and the data address which causes the data abort to the location which the decompressed file are stored in.

7. The method according to claim 1, further comprising determining, based on a page frame alignment, a location within the designated memory for storing the decompressed file, and wherein storing the decompressed file in the designated memory includes storing the decompressed file in the determined location within the designated memory.

8. The method according to claim 1, wherein determining the storage location of the compressed file outside a controller of the mobile terminal comprises the mobile terminal entering an abnormal mode; and when operating based on the decompressed file, the mobile terminal restores to a working mode and state before the abnormal mode.

9. The method according to claim 1, wherein the compressed file is contained in image files stored in an external auxiliary memory, and the image files further contain an uncompressed file.

10. The method according to claim 9, wherein when the uncompressed file which is not stored inside the controller of the mobile terminal is needed to be operated, the controller of the mobile terminal operates based on the uncompressed file stored in the external auxiliary memory; or the controller of the mobile terminal moves the uncompressed file from the external auxiliary memory to the external memory outside the controller of the mobile terminal, and then the controller of the mobile terminal operates based on the uncompressed file stored in the external memory outside the controller of the mobile terminal.

11. The method according to claim 9, wherein the image files comprise instruction, constants, resource data of software interface display, un-initialized variables, and initialized variables of a program.

12. The method according to claim 1, further comprising: operating an uncompressed file to initialize the operating environment.

13. The method according to claim 12, wherein if the uncompressed file is stored in the NAND flash memory, operating an uncompressed file comprises: copying the uncompressed file stored in the NAND flash to the external memory outside the controller of the mobile terminal, and operating the uncompressed file stored in the external memory outside the controller of the mobile terminal.

14. The method according to claim 12, wherein if the uncompressed file is stored in the NOR flash memory, operating the uncompressed file comprises: operating the uncompressed file stored in the NOR flash.

15. The method according to claim 1, wherein the designated memory is set to either an internal memory inside the controller or to an external memory outside the controller based at least in part on an access speed associated with the storage location of the compressed file.

16. The method according to claim 1, wherein the setting of the designated memory for storing the decompressed file is based on an access speed of the determined storage location of the compressed file.

17. The method according to claim 16, further comprising:

determining the access speed of the determined storage location of the compressed file.

18. A system for demand paging in a mobile terminal, comprising:

a controller, one or more processors configured by instructions to:

determine a storage location of a compressed file configured outside a controller of the mobile terminal;

store the compressed file in an external auxiliary memory based on an index list of the compressed file;

decompress the compressed file stored in the external auxiliary memory by a decoding unit, wherein the decoding unit is in a hardware form; and operate the mobile terminal based on the decompressed file: and one or more memories coupled with the one or more processors for storing the decompressed file, wherein the one or more processors comprise at least one controller and at least one decoding unit; and the one or more memories comprise an external memory configured outside the controller and an internal memory configured inside in the controller, wherein the one or more processors are further configured to:

set a designated memory for storing the decompressed file based on the determined storage location of the compressed file, wherein the designated memory is set by selecting the external memory outside the controller or internal memory inside the controller, and wherein setting the designated memory for storing the decompressed file based on the determined storage location of the compressed file comprises:

when the storage location of the compressed file is determined as being in a NOR flash memory, the designated memory is set to an external memory outside the controller, and when the storage location of the compressed file is determined as being in a NAND flash memory, the designated memory is set to an internal memory inside the controller; and store the decompressed file in the designated memory;

the index list comprises a plurality of index units to identify an absolute location of the compressed file;

each index unit of the plurality of index units comprises a plurality of index addresses to direct to the compressed file;

each index unit of the plurality of index units defines the length of each of the compressed file;

each index unit of the plurality of index units is stored in the head of the compressed file;

the absolute location comprises an instruction address generated in an abnormal mode and a data address; and the storage location comprises a location in at least one of a NOR flash memory, and an external memory to which the compressed file is moved from a NAND flash memory.

19. The system for demand paging in the mobile terminal according to claim 18, wherein the compressed file and an uncompressed file comprise instructions, constants, resource data of software interface display, initialized variables and un-initialized variables.

20. The system for demand paging in the mobile terminal according to claim 18, where the external auxiliary memory comprises one of a flash memory, a hard disk, an optical disk and a USB flash.

21. The mobile terminal according to claim 18, where the one or more processors are further configured to:

operate the uncompressed file stored in the external auxiliary memory, and operate the uncompressed file which are moved from the external auxiliary memory to an external memory configured outside the controller of the mobile terminal.

* * * * *